June 15, 1943.      I. V. MOULIN      2,321,697
PHOTOGRAPHIC APPARATUS
Filed Aug. 2, 1940      2 Sheets-Sheet 1
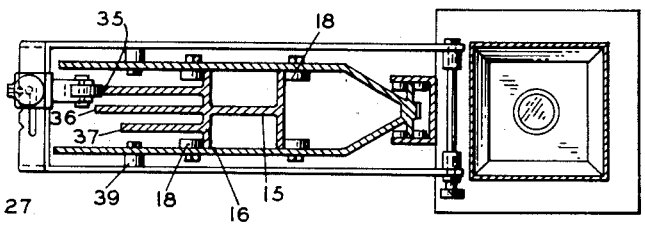
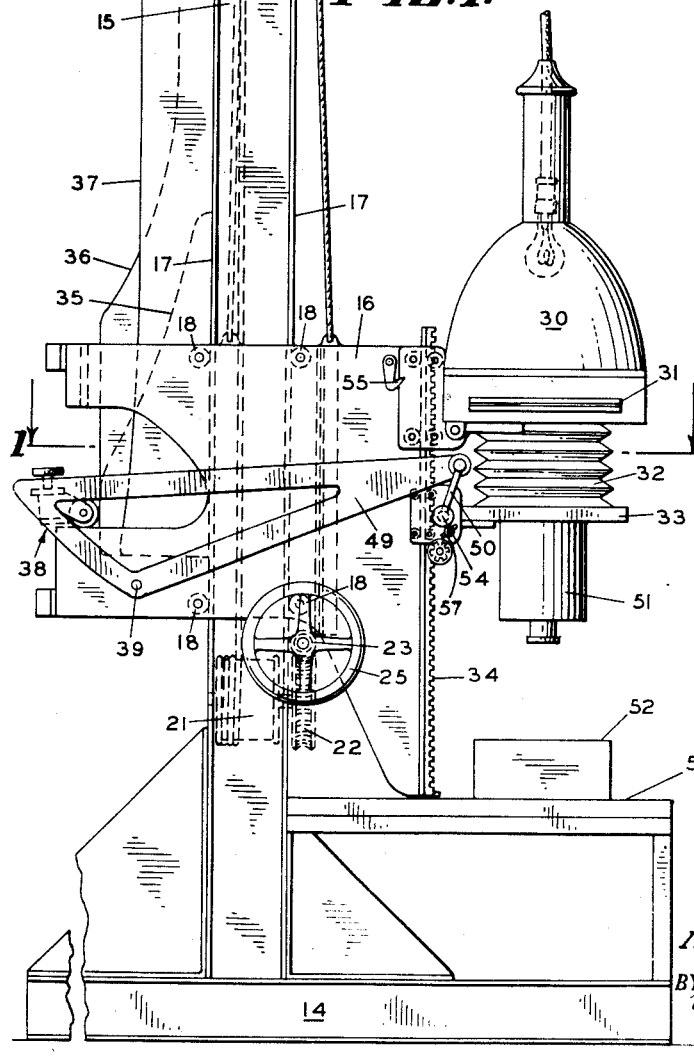
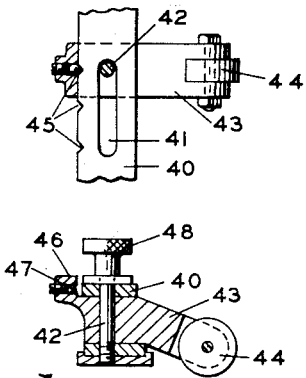
INVENTOR.
IRVING VICTOR MOULIN
BY Robert M. McManigal
ATTORNEY June 15, 1943.  I. V. MOULIN  2,321,697
PHOTOGRAPHIC APPARATUS
Filed Aug. 2, 1940    2 Sheets-Sheet 2

INVENTOR.
IRVING VICTOR MOULIN
BY Robert M. McManigal
ATTORNEY

Patented June 15, 1943

2,321,697

UNITED STATES PATENT OFFICE 2,321,697

PHOTOGRAPHIC APPARATUS

Irving Victor Moulin, San Francisco, Calif.

Application August 2, 1940, Serial No. 349,678

3 Claims. (Cl. 88—24)

The object of my invention is to provide an enlarging and reducing camera or projector in which the elements of the camera or projector are so connected that the camera or projector is automatically kept in focus at all times, whether the image is enlarged, reduced or the same size.

Another object of my invention is to provide an automatic focus enlarging and reducing device with a simple and fool-proof operating mechanism between a fixed cam and a lens holder or a negative holder of a movable carriage, so that the device is automatically kept in focus at all times.

Another object of my invention is to provide an automatic focus enlarging and reducing device with an operating lever mechanism in which one arm of the lever mechanism is guided by a fixed cam and another arm is connected to a negative holder.

Another object of my invention is to provide an automatic focus enlarging and reducing device in which a rigid support is provided with a fixed cam and a movable projector carriage having a negative holder and a lens holder, mechanism for raising and lowering the projector carriage and lever means pivotably mounted on the carriage, one arm of the lever means adapted to be moved by the fixed cam as the carriage is raised and lowered, and another arm of the lever means adapted to be connected to one of the holders for changing the distance between the negative holder and the lens holder in order to maintain the device in focus at all times.

Another object of my invention is to provide an automatic focus enlarging and reducing device with a plurality of fixed cam surfaces which are adapted to be selectively connected to the lens holder or the negative holder in order to automatically change the distance between the said holders.

Another object of my invention is to provide an automatic focus enlarging and reducing device which is sturdy in construction and easy and fool-proof in operation.

My invention has many other objects, advantages, and features, some of which, with the foregoing, will be set forth at length in the following description where I shall outline one form of my invention, which I have selected for illustration in the drawings accompanying and forming a part of the present specification.

Referring to the drawings:

Fig. 1 is a side elevation of the enlarging and reducing device of my invention working on the extreme reducing cam.

Fig. 2 is a view taken on the line 1—1 of Fig. 1 partly in section.

Fig. 3 is a plan view of the adjustable roller arm partly in section.

Fig. 4 is a cross section of the adjustable roller arm and roller shown in Fig. 3.

Figure 6:
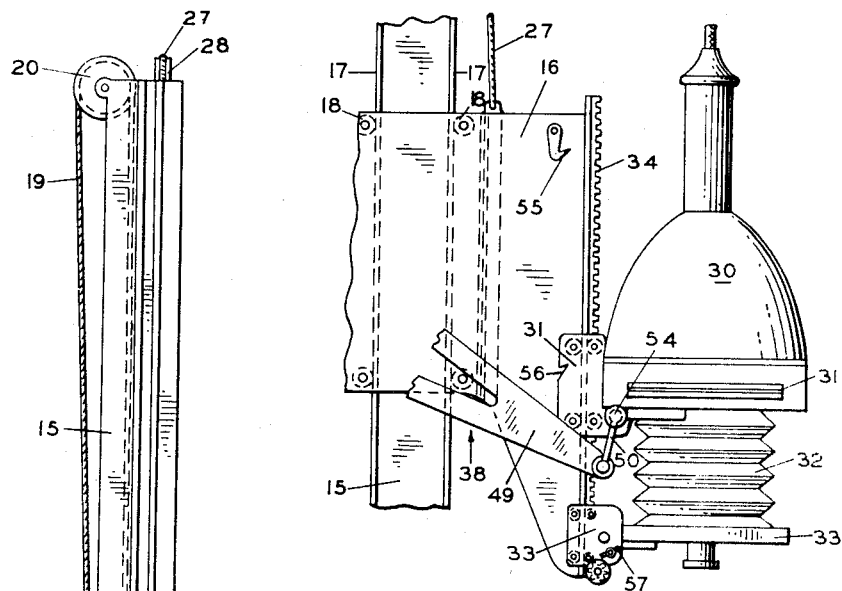
Fig. 6 is a fragmentary view showing one of the lever arms connected to the negative holder.

In the drawings, the numeral 14 indicates a rigid base upon which a support 15 is rigidly mounted by means of braces. Mounted on the support 15 is a projector carriage 16.

Means are provided for raising and lowering the projector carriage 16. As an instance of this arrangement the support 15 is provided with slide surfaces 17 on which rollers 18 of the projector carriage 16 are adapted to roll. A cable 19 extending over pulley 20 is secured at one end to the projector carriage 16 and the other end of said cable is wound over and secured to drum 21. The drum is adapted to be rotated by means of a gear 22, worm gear 23, shaft 24 and wheels 25 and 26. The carriage 16 is also supported in part by a cable 27 which is wound over a pulley 28 to the counterweight 29.

The projector carriage 16 is provided with a lamp house 30, a negative holder 31, bellows 32, a lens holder 33 and a rack 34. The rack 34 is provided so that the device may be manually operated, when such manual operation is desired.

Means are also provided to change the distance between the negative holder 31 and the lens holder 33 as the carriage 16 is raised and lowered on the support 15. As an instance of this arrangement the rigid support 15 is provided with fixed cams 35, 36 and 37. A lever means 38 is pivoted on said carriage 16 at 39, and is adapted to be selectively operated by one of the cams 35, 36 and 37. As an instance of this arrangement, one arm 40 of the lever means 38 is provided with a slot 41 in which a bolt 42 is mounted. Mounted on the bolt 42 is an adjustable roller arm 43 which supports a roller 44 which is adapted to run on one of the cams 35, 36 and 37.

In order to insure proper alignment between the roller 44 and the cams 35, 36 and 37, the outer portion of the arm 40 is provided with three holes 45 in alignment with said cams, and the roller arm 43 is provided with an upper extension 46 having a spring pressed ball 47 which is adapted to be seated in the holes 45.

The bolt 42 is provided with a knurled bolt head 48 in order to secure the bolt 42 in position in the slot 41.

The other arm 49 of the lever means 38 is adapted to be selectively connected to either the negative holder 31 as shown in Fig. 6 or to the lens holder 33 as shown in Fig. 1 by means of a U-shaped link 50.

In making extreme reductions a relatively shorter focus lens is used than when making enlargements. The tunnel extension 51 also aids in making greater reductions as does sensitized material support 52.

The tunnel 51 is also utilized in making extreme enlargements when a faster and relatively shorter focus lens is inserted in the lens holder and the tunnel is inverted and placed in the projector instead of out.

A relatively longer focus lens is used when the lever means is connected to the negative holder as shown in Fig. 6. The support 52 is removed and the image is made on sensitized material support 53.

The shapes of the cams may be either computed or determined by trial and error. The shape of each cam is such that the lever means is pivoted to effect an exact adjustment for the particular lens used with respect to the negative as the carriage is raised and lowered on the support so that the apparatus is automatically kept in focus in the plane of the sensitized material support at all times.

Although I prefer to use three cams, any desired number of cams may be used.

Figure 5:
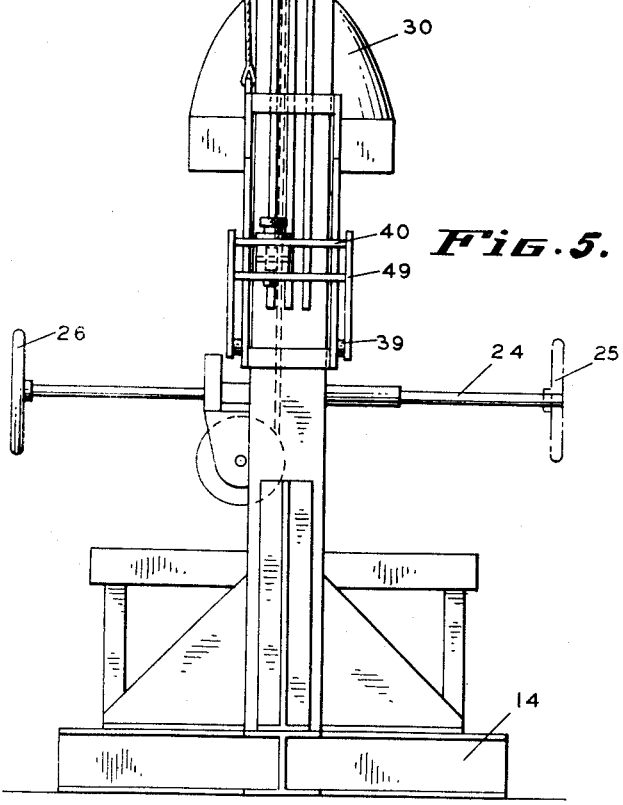
Fig. 5 is a rear view showing the position of the cams on the support with the projector on the extreme reducing cam.

As shown in Figs. 1 and 5 the cam 35 is comparatively short and forms an appreciable angle with the vertical support. This cam is used in making extreme reductions. In order to get the full reducing range the lens has to move relative to the carriage, therefore the lever link 50 is connected to the lens holder 33. The use of a relatively short focus lens and a tunnel extension 51 increases the reducing limits.

The cam 36 has a somewhat abrupt curve in its lower portion and is used in making enlargements down through same size to reduced images. A medium focus lens that will properly cover the negative is best for the universal cam 36. To take advantage of same size as well as reductions the negative holder 31 has to move relative to the carriage 16, therefore the link 50 is connected to the negative holder 31.

The cam 37, except for the lower end where it curves slightly to the left, is almost straight and forms only a small angle with the vertical support. This cam is used in making extreme enlargements. For extreme enlargements a shorter focus lens than the one used on cam 36 is necessary. A recessed lens board or tunnel is desirable in order to make large images. The link 50 could be attached to either holder 31 or 33. I prefer to attach the link 50 to the negative holder 31 as the shape of the cam 37 indicates.

In making extreme reductions the lever arm 49 is connected to the lens holder 33 by means of U-shaped link 50 as shown in Fig. 1. In the universal position shown in Fig. 6 in which the cam 36 is used to make enlargements down through the same size to reductions the lever arm 49 is connected to the negative holder 31.

In changing to the universal position from extreme reductions the operation is as follows:

The bolt 54 is withdrawn from the lens holder 33 and the U-shaped link 50 is turned through approximately 180 degrees and then attached to the negative holder 31 by means of the bolt 54.

The knurled bolt 48 is loosened and the roller arm 43 is moved until the roller 44 is in alignment with the cam 36 so that the spring pressed ball 47 is seated in the groove 45, and the bolt head 48 is then tightened. The catch 55 is removed from the notch 56 of the negative holder 31, and the negative holder 31 is gently lowered until the roller 44 rides on the cam 36. The lens holder 33 is moved to the bottom of rack 34 as shown in Fig. 6 and the set screw 57 is tightened to hold it there. The proper lens is then inserted in the lens holder 33. One of the wheels 25, 26 is rotated. As the carriage 16 is raised, the roller 44 due to the shape of the cam 36 moves to the right, pivoting the lever means 38 about the pivot 39 to the right and lowering the negative holder 31 with respect to the lens holder 33. As the carriage 16 is lowered, the roller 44 due to the shape of the cam 36 moves to the left, pivoting the lever means 38 about the pivot 39 to the left, and raising the negative holder 31 with respect to the lens holder 33. The wheel 25, 26 is rotated until the desired size of the image is obtained.

In changing the projector to make extreme reductions the operation is as follows:

The negative holder 31 is secured in position by means of catch 55 engaging the notch 56 of the negative holder. The knurled bolt head 48 is loosened and the roller arm 43 is moved until the roller is in alignment with short cam 35 so that spring pressed ball 47 will snap in a groove 45, and the bolt head 48 is then tightened. The pin or bolt 54 is then withdrawn from the negative holder and the lever arm 49 is then lowered until roller 44 rides on cam 35. The U-shaped link 50 is then turned through approximately 180 degrees and then attached to the lens holder 33 by means of the bolt 54. The relatively shorter focus lens and tunnel 51 are then attached to the lens holder 33 as shown in Fig. 1. The sensitized material support 52 is placed on the support 53. One of the wheels 25, 26 is turned until the desired size of image is obtained. As the carriage 16 is raised, the roller 44 is moved to the right due to the shape of the cam 35, pivoting the lever means 38 about the pivot 39 to the right and lowering the lens holder 33 with respect to the negative holder 31 and making a smaller image on the sensitized material support 52. As the carriage 16 is lowered, the roller 44 is moved to the left due to the shape of the cam 35, pivoting the lever means 38 about the pivot 39 to the left and raising the lens holder 33 with respect to the negative holder 31 and making a larger image on the material support 52.

The lens holder 33 is provided with a pinion which engages the rack 34 in order to facilitate the manual adjustment of the focus of the lens when the above-mentioned cam and lever means is not used.

My invention may be used in cameras as well as projectors by placing the sensitized film, glass, paper, or material where the negative is placed in projectors and placing the object to be photographed where the image is placed in projectors.

A simplified apparatus may be made by using only a single cam. In using a device with only a single cam, I would prefer to use a cam similar to the universal cam 36 in that with the use of such a cam enlargements, images of the same size, and reductions can be made. However, in other instances, cams similar to the cams 35 or 37 would be preferred, even though only a single cam is used.

From the foregoing description taken in connection with the accompanying drawings, the uses, advantages, and operation of my invention will be readily understood by those skilled in the art to which the invention appertains. While I have described the form of my invention which I now consider to be the best embodiment thereof, I desire to have it understood that the form shown is merely illustrative and that the invention is not to be limited to the details disclosed herein, but it is to be accorded the full scope of the appended claims.

I claim:

1. Photographic apparatus comprising a rigid support having plurality of fixed cams, a carriage adapted to be raised and lowered on said support, said carrier having a negative holder and a lens holder, mechanism for raising and lowering said carriage, and lever means pivotably mounted on said carriage, one arm of said lever means adapted to be moved by one of said cams as the carriage is raised and lowered, and another arm of said lever means adapted to be selectively connected to one of said holders for changing the distance between said negative holder and said lens holder.

2. Photographic apparatus comprising a rigid support having a plurality of fixed cams, a carriage adapted to be raised and lowered on said support, mechanism for raising and lowering said carriage, said carriage having a negative holder and a lens holder, lever means pivotably mounted on said carriage, and means for selectively connecting one of the arms of said lever means in operative position with respect to any one of said cam surfaces, one arm of said lever means being adapted to be moved by the cam surface in operative position with said lever means as the carriage is raised and lowered, and another arm of said lever means adapted to be selectively connected to one or the other of said holders for changing the distance between said negative holder and said lens holder.

3. Photographic apparatus comprising a rigid support provided with a fixed cam extending longitudinally along one side thereof, a carriage movable longitudinally on said support, said carriage including a negative holder and a lens holder positioned on the opposite side of said support from said cam, and a generally U-shaped lever member pivotally mounted on said carriage and surrounding said support with the closed end of said U-shaped lever member being in juxtaposition to and guided by said cam, and the opposite end of said U-shaped lever member being connected to one of said holders to change the distance between said negative holder and said lens holder upon longitudinal movement of said carriage along said support.

IRVING VICTOR MOULIN.